US012673595B2

(12) United States Patent
Song et al.

(10) Patent No.: US 12,673,595 B2
(45) Date of Patent: Jul. 7, 2026

(54) MORPHING ORIGAMI STRUCTURES

(71) Applicant: Toyota Motor Engineering & Manufacturing North America, Inc., Plano, TX (US)

(72) Inventors: Yuyang Song, Ann Arbor, MI (US); Shinnosuke Shimokawa, Ann Arbor, MI (US)

(73) Assignees: Toyota Motor Engineering & Manufacturing North America, Inc., Plano, TX (US); Toyota Jidosha Kabuhiki Kaisha, Toyota (JP)

( * ) Notice: Subject to any disclaimer, the term of this patent is extended or adjusted under 35 U.S.C. 154(b) by 219 days.

(21) Appl. No.: 18/588,197

(22) Filed: Feb. 27, 2024

(65) Prior Publication Data

US 2025/0269779 A1 Aug. 28, 2025

(51) Int. Cl.
| | |
|---|---|
| *B60N 2/90* | (2018.01) |
| *B60N 2/02* | (2006.01) |
| *B60N 2/16* | (2006.01) |
| *B60N 2/18* | (2006.01) |

(52) U.S. Cl.
CPC .......... B60N 2/914 (2018.02); B60N 2/0244 (2013.01); B60N 2/1665 (2013.01); B60N 2/1878 (2013.01)

(58) Field of Classification Search
None
See application file for complete search history.

(56) References Cited

U.S. PATENT DOCUMENTS

| | | | | |
|---|---|---|---|---|
| 11,590,872 | B2 * | 2/2023 | Perkins | B60N 2/874 |
| 2003/0030319 | A1 * | 2/2003 | Clapper | A47C 4/54 |
| | | | | 297/452.41 |
| 2021/0175406 | A1 * | 6/2021 | Moon | H10N 10/01 |
| 2024/0084788 | A1 * | 3/2024 | Song | F03G 7/0612 |

OTHER PUBLICATIONS

Wang S, Yan P, Huang H, Zhang N, Li B. Inflatable Metamorphic Origami. Research (Wash D C). May 4, 2023;6:0133. doi: 10.34133/research.0133. PMID: 37228636; PMCID: PMC10204744 (Year: 2023).*
C. Zhou, J. Li, J. Long, S. Ge and G. Lu, "Design of Shape Actively Controllable Planar Pneumatic Kirigami Actuator," in IEEE Robotics and Automation Letters, vol. 8, No. 5, pp. 2582-2589, May 2023, doi: 10.1109/LRA.2023.3256925 (Year: 2023).*
Yu et al., "Programming curvatures by unfolding of the triangular Resch pattern," International Journal of Mechanical Sciences, vol. 238, Jan. 15, 2023, pp. 1-39.
Melancon et al., "Multistable inflatable origami structures at the metre scale," Nature vol. 592, 2021, pp. 545-550.

* cited by examiner

*Primary Examiner* — Laert Dounis
(74) *Attorney, Agent, or Firm* — Christopher G. Darrow; Darrow Mustafa PC

(57) ABSTRACT

A morphing structure includes a tessellation origami structure with a plurality of polygons having a plurality of outer polygon facets, and a plurality of inflatable cells attached to the plurality of outer polygon facets. The plurality of inflatable cells are selectively inflatable such that the morphing structure is an in-situ shape changing morphing structure. In some variations, a compressed gas supply is in communication with the plurality of inflatable cells and a controller in communication with the compressed gas supply.

20 Claims, 11 Drawing Sheets

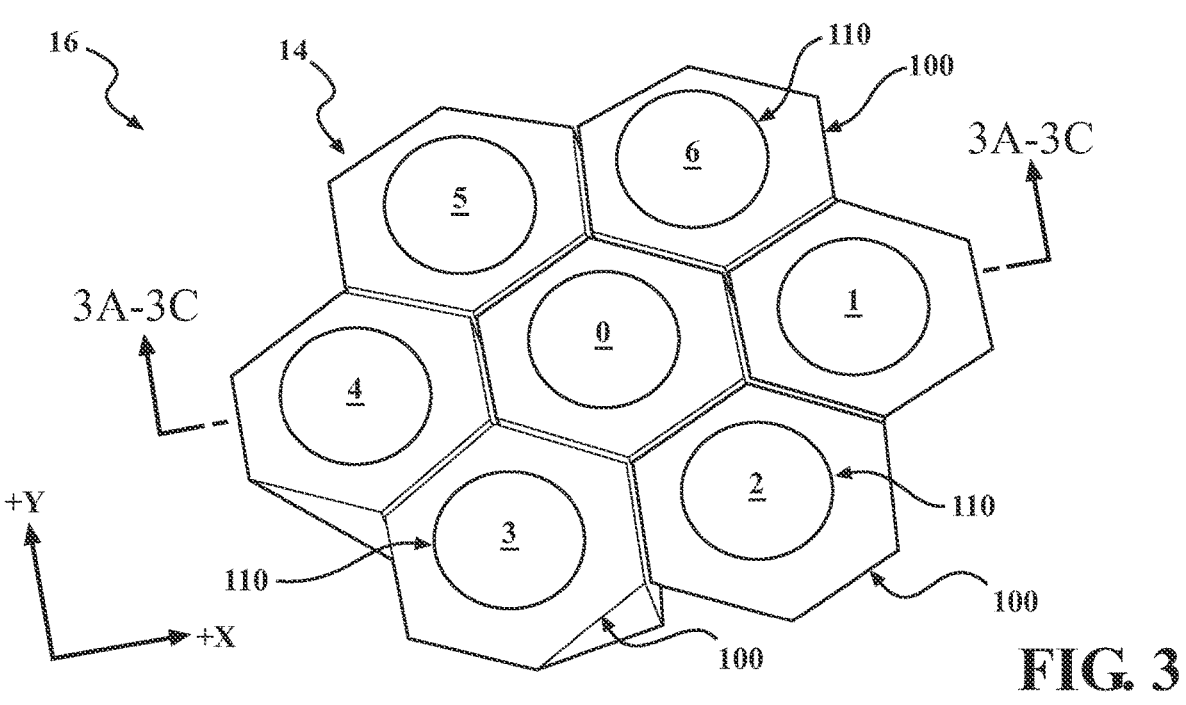
FIG. 3
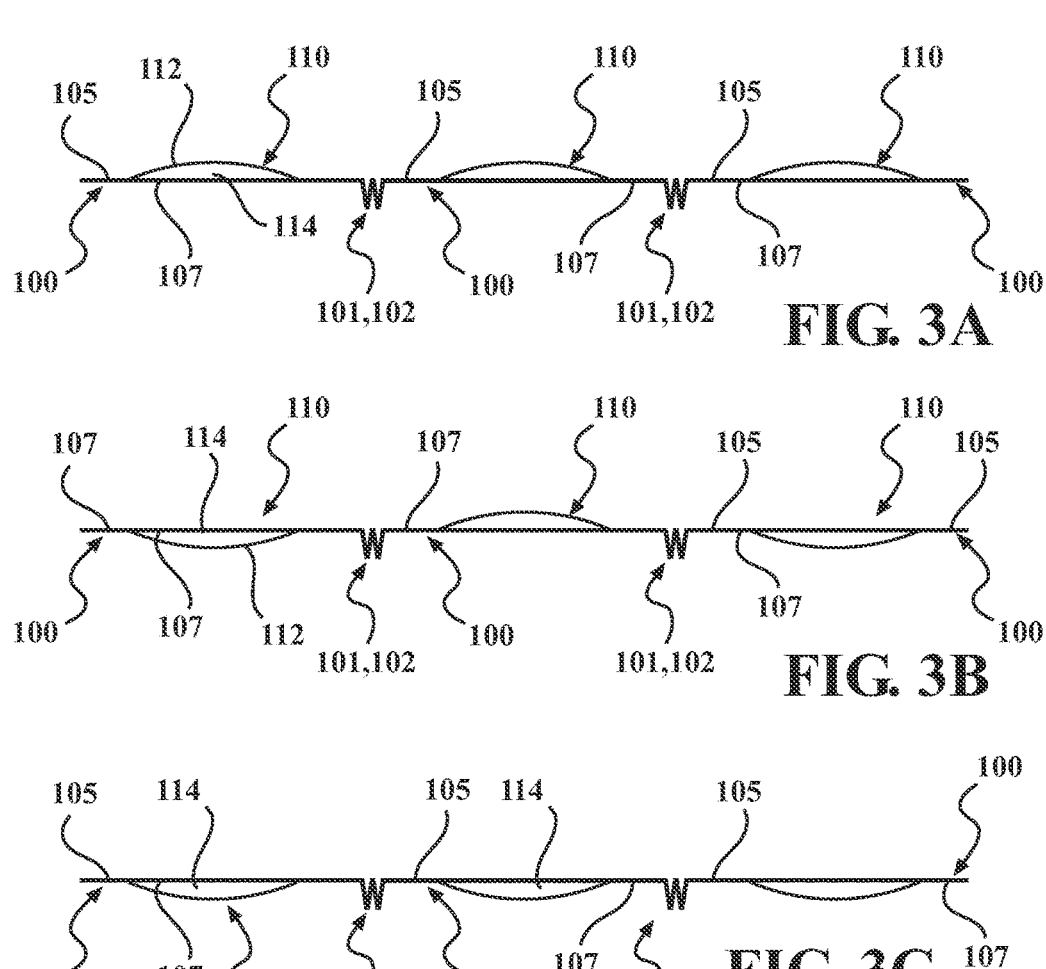
FIG. 3A
FIG. 3B
FIG. 3C

MORPHING ORIGAMI STRUCTURES

TECHNICAL FIELD

The present disclosure generally relates to morphing structures, and particularly to morphing origami structures.

BACKGROUND

Morphing structures provide a range of services and functions. For example, various forces such as acceleration forces, stopping forces, and lateral forces, among others, can act on a vehicle during normal operation thereof. And the effect of such forces on an individual driving or riding in such a vehicle can be reduced with one or more morphing structures within the vehicle. However, the complexity of such morphing structures can be more than desirable.

The present disclosure addresses the issue of complex morphing structures, and other issues related to morphing structures.

SUMMARY

In one form of the present disclosure, a morphing structure includes a tessellation origami structure with a plurality of polygons having a plurality of outer polygon facets, and a plurality of inflatable cells attached to the plurality of polygons, the plurality of inflatable cells being selectively inflatable such that the morphing structure is an in-situ shape changing morphing structure.

In another form of the present disclosure, a morphing structure includes a tessellation origami structure with a plurality of polygons having a plurality of outer polygon facets, and a plurality of inflatable cells attached to the plurality of outer polygon facets. The plurality of inflatable cells are selectively inflatable such that the morphing structure is an in-situ shape changing morphing structure. In some variations, a compressed gas supply is in communication with the plurality of inflatable cells and a controller in communication with the compressed gas supply.

In still another form of the present disclosure, a morphing structure includes a tessellation origami structure comprising a plurality of polygons having a plurality of outer polygon facets, and the plurality of polygons include more than one type of polygon. The morphing origami structure also includes a plurality of inflatable cells attached to the plurality of outer polygon facets and the plurality of inflatable cells are selectively inflatable such that the morphing structure is an in-situ shape changing morphing structure. A compressed gas supply in communication with the plurality of inflatable cells is included, as is a controller in communication with the compressed gas supply. The controller is configured to command a first pressure configuration for the plurality of inflatable cells and a second pressure configuration for the plurality of inflatable cells different than the first pressure configuration. In some variations, the first pressure configuration includes a pressure in an inflatable cell attached to a central polygon of the morphing structure being greater than a sum of the pressures in inflatable cells attached to outer polygons of the morphing structure. In at least one variation, the second pressure configuration includes a pressure in an inflatable cell attached to the central polygon being less than any pressure in the inflatable cells attached to the outer polygons. And in some variations, the second pressure configuration includes a pressure in the inflatable cell attached to the central polygon being less than a sum of the pressures in the inflatable cells attached to the plurality of outer polygons.

These and other features of the morphing structures will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein:

FIG. 3 shows the resch origami structure in FIG. 2D in a first shape configuration and with inflatable cells attached to outer polygon facets of the resch origami structure such that a morphing origami structure is formed according to the teachings of the present disclosure;

FIG. 3A is a cross-section view of section 3A-3C-3A-3C in FIG. 3 according to one form of the present disclosure;

FIG. 3B is a cross-section view of section 3A-3C-3A-3C in FIG. 3 according to another form of the present disclosure;

FIG. 3C is a cross-section view of section 3A-3C-3A-3C in FIG. 3 according to yet another form of the present disclosure;

It should be noted that the figures set forth herein is intended to exemplify the general characteristics of the devices and methods among those of the present technology, for the purpose of the description of certain aspects. The figures may not precisely reflect the characteristics of any given aspect and are not necessarily intended to define or limit specific forms or variations within the scope of this technology.

DETAILED DESCRIPTION

The present disclosure provides a morphing origami structure. The morphing origami structure includes a resch origami structure and selectively inflatable cells attached to the resch origami structure. As used herein, the phrase "morphing origami structure" refers to an origami structure that changes shape in response to an applied force, the phrase "resch origami structure" refers to an origami structure formed from a tessellation origami pattern with more than one type of polygon, the phrase "tessellation origami pattern" refers to a pattern or tiling that covers a surface using one or more geometric shapes with no overlaps and no gaps, and the phrase "origami structure" refers to a three dimensional (3D) structure formed from a fold sheet of material.

The resch origami structure includes a first set of polygons spaced apart from each other by a second set of polygons and the selectively inflatable cells are attached to one or more of the first set of polygons. The first set of polygons each have an outer facing polygonal facet and an inner facing polygonal facet. As used herein, the phrase "outward facing polygonal facet" refers to a polygonal facet that forms part of a surface that is not intersected by the second set of polygons and is opposite or opposed to the "inward facing polygonal facet" that forms a surface that is intersected by the second set of polygons. The selectively inflatable cells are attached to the one or more of the outer facing polygonal facets and/or one or more of the inner facing polygonal facing facets.

The morphing origami structure has a first shape configuration (also referred to herein simply as "first shape") and a second shape configuration (also referred to herein simply as "second shape") different than the first shape configuration. In some variations, the first shape is a stored or non-deployed shape for the morphing origami structure and the second shape is a deployed shape for the morphing origami structure. In addition, inflating (pressuring) one or more of the inflatable cells attached to the one or more of the polygons results in the morphing origami structure morphing from the first shape configuration to the second shape configuration or morphing from the second shape configuration to the first shape configuration. Accordingly, the morphing origami structure can be controlled or commanded to change its shape in-situ and thereby provide a functional surface such as a load bearing surface, a support surface, a barrier surface, among others.

Figure 1A:
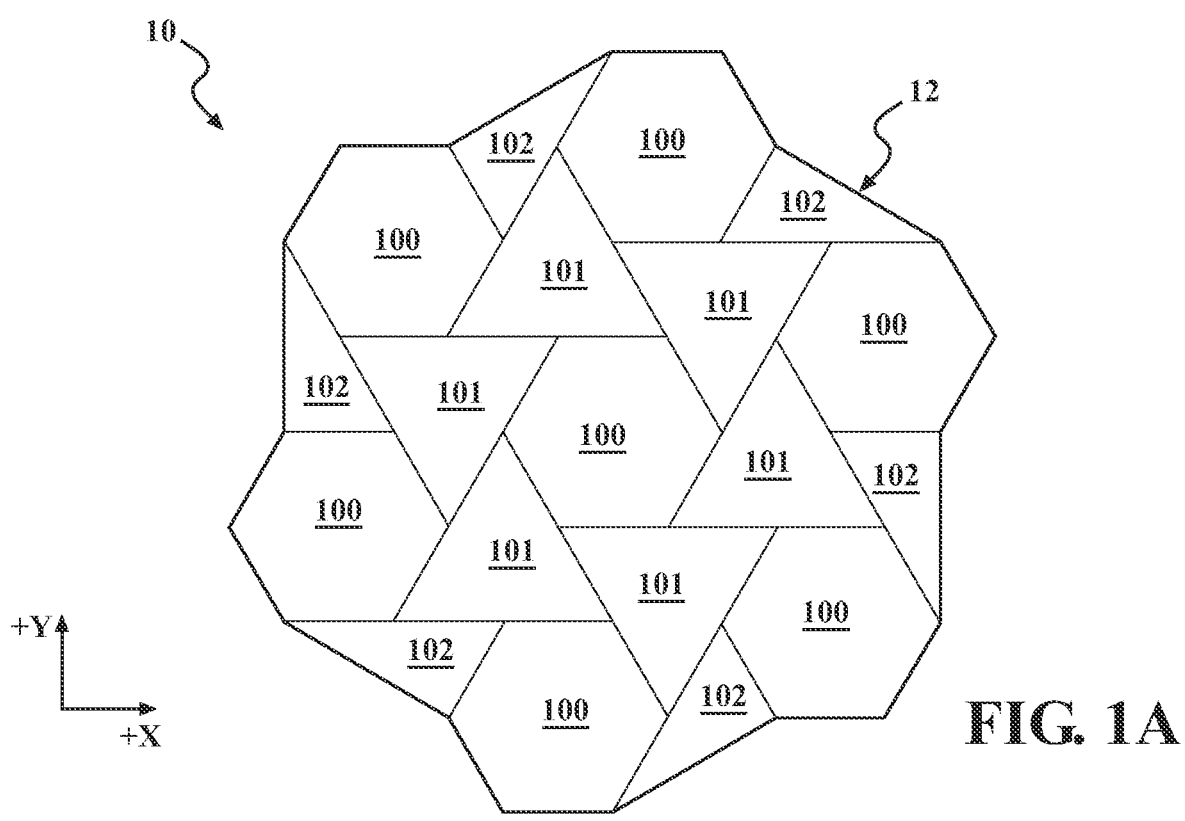
FIG. 1A shows a top view of a tessellation origami sheet with a plurality of polygons.

Referring to FIG. 1A, a sheet of material 10 with a resch origami pattern 12 is shown. The resch origami pattern 12 includes hexagonal polygons (also referred to herein as "hexagons") 100 and triangles 101, 102. In some variations, the triangles 101 are oblique triangles and the triangles 102 are right triangles. And while FIG. 1A shows only two different types of polygons, i.e., hexagons and triangles, it should be understood that morphing origami structures according to the teachings of the present disclosure can include more than two different polygons and/or polygons different than hexagons and/or triangles.

Figure 1B:
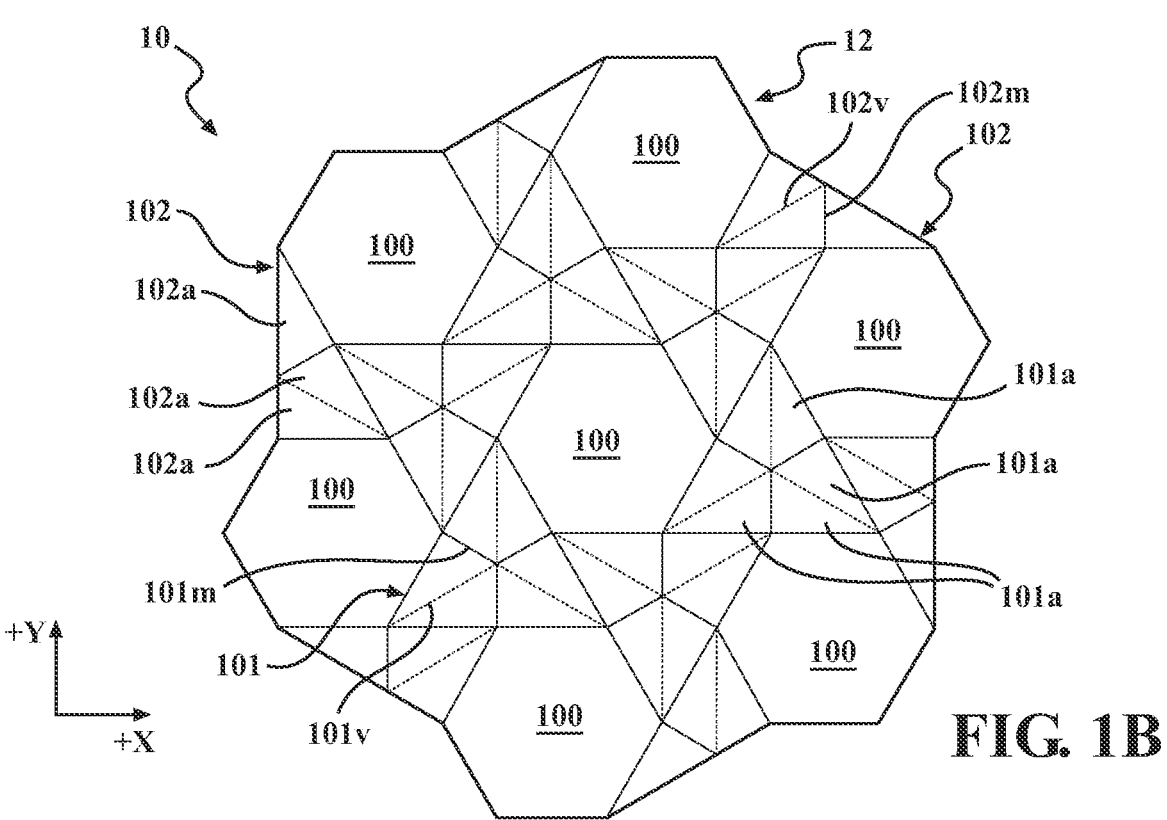
FIG. 1B shows FIG. 1A with fold lines.
Figure 2A:
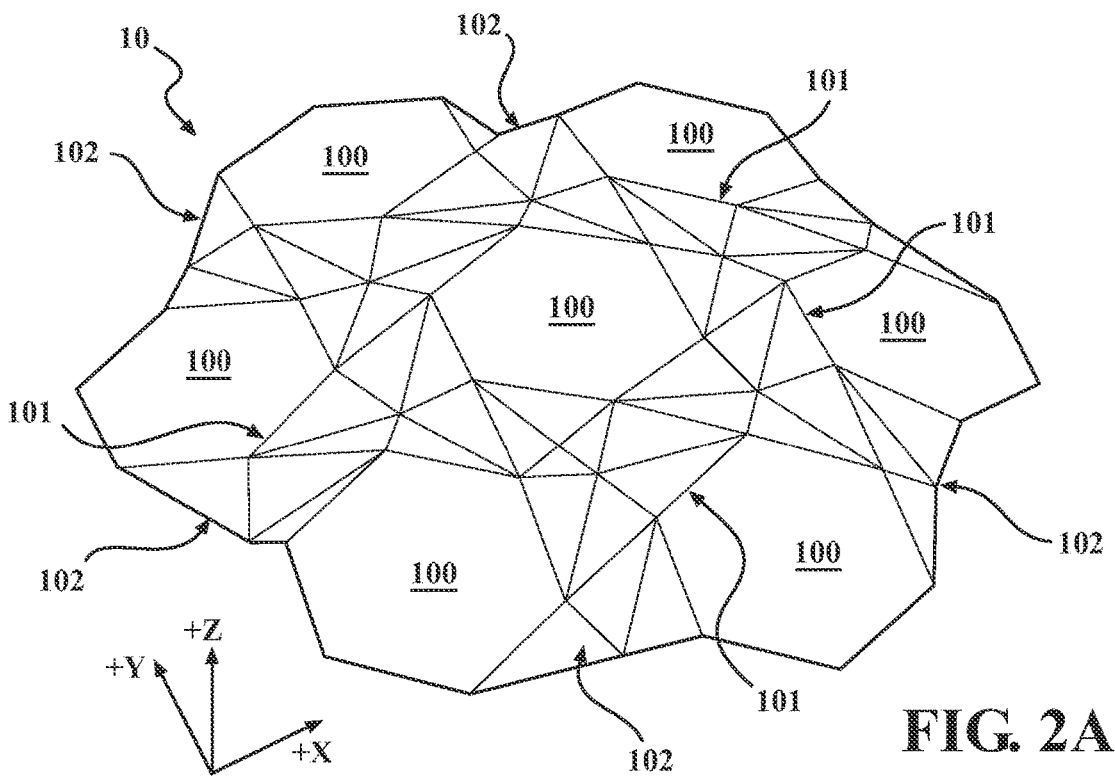
FIG. 2A shows a perspective view of the tessellation origami sheet in FIG. 1A being folded along the fold lines illustrated in FIG. 1B as part of folding process to form a resch origami structure.
Figure 2B:
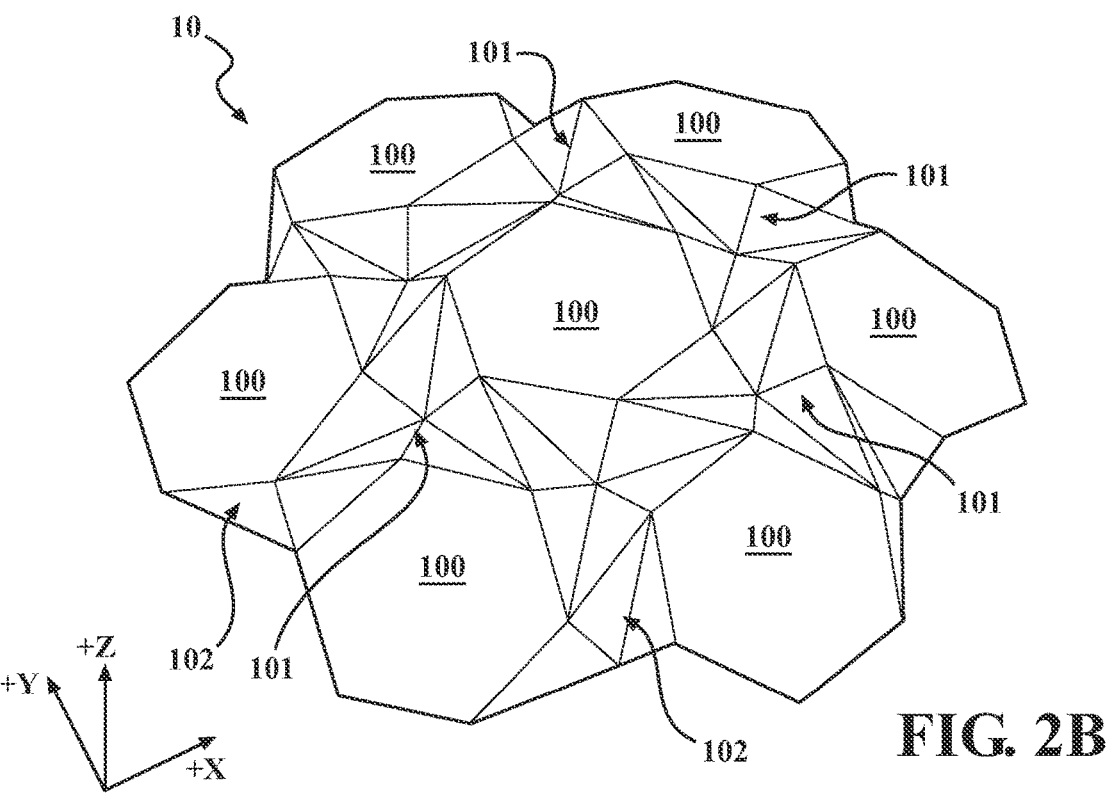
FIG. 2B shows a perspective view of the tessellation origami sheet in FIG. 2A with additional folding along the fold lines.
Figure 2C:
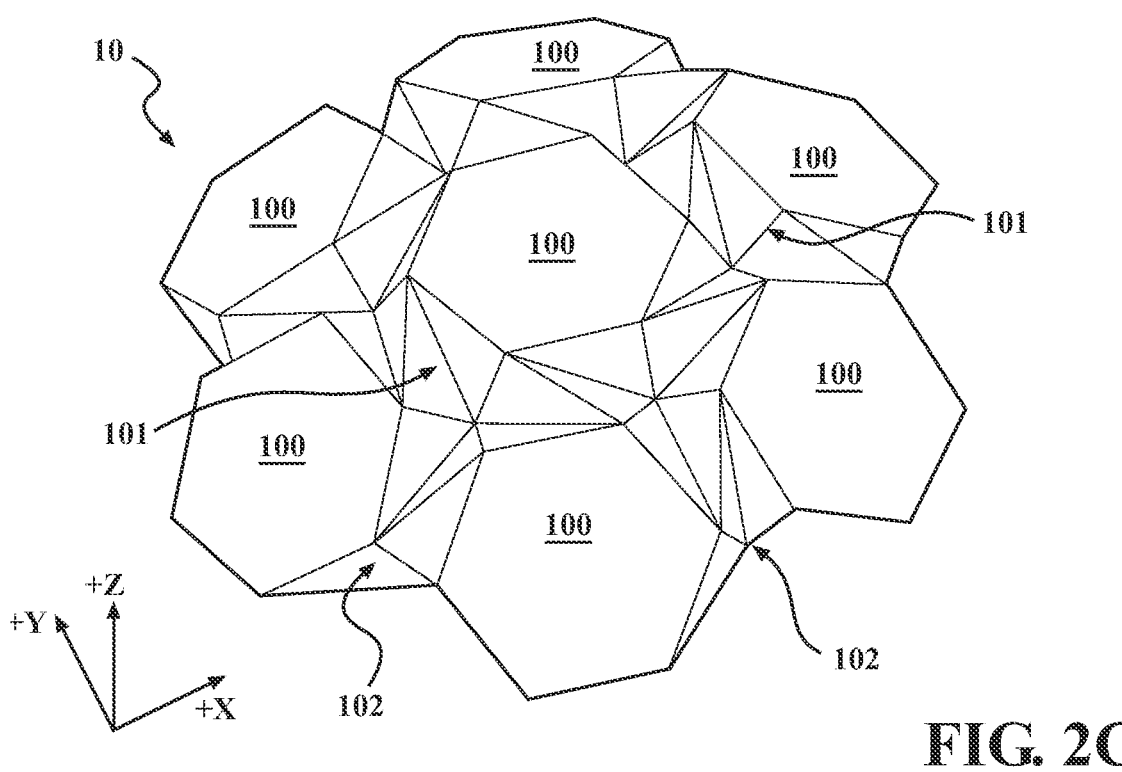
FIG. 2C shows a perspective view of the tessellation origami sheet in FIG. 2B with additional folding along the fold lines.
Figure 2D:
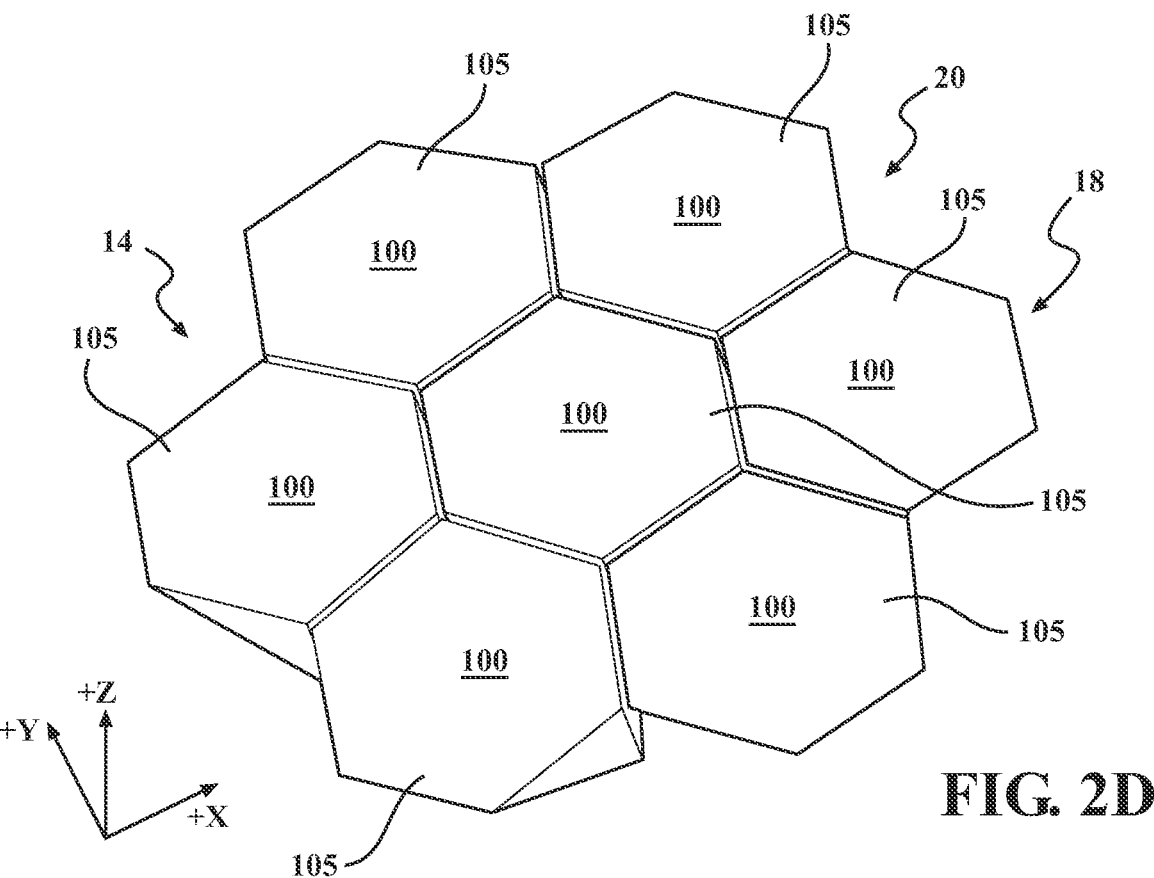
FIG. 2D shows a perspective view of a resch origami structure formed from the tessellation origami sheet in FIGS. 1A-1B via folding along the fold lines as illustrated in FIGS. 2A-2C.

Referring to FIG. 1B, the sheet of material 10 is shown with solid lines 101m, 102m illustrating mountain fold lines and dotted lines 101v, 102v illustrating valley fold lines. That is, when the sheet of material 10 is folded into an origami structure, the solid lines 101m, 102m will form a "mountain" crease extending in the +z direction shown in the figures and the dotted lines 101v, 102v will form a "valley" crease extending in the −z direction shown in the figures.

Referring to FIGS. 2A-2D, folding of the sheet of material 10 into a resch origami structure 14 is illustrated. Particularly, the sheet of material 10 is folded along the fold lines (not labeled or shown as solid lines and dotted lines) such that each of the triangles 101, 102 (FIG. 1A) fold into itself and the hexagonal polygons 100 form an outer facing surface 18 (FIG. 2D) with a tile pattern 20 (FIG. 2D) in the form of a plurality of outer polygons disposed around a central polygon.

It should be understood that depending on the mechanical and/or physical properties of the sheet of material 10, the resch origami structure 14 can have a range of mechanical properties. For example, depending on the thickness, strength, and elastic modulus of the sheet of material 10, the resch origami structure 14 can have a range of load bearing strength, spring strength (e.g., when moving from the shape shown in FIG. 2D to the shape shown in FIG. 2B). In addition, it should be understood that treatment (e.g., thermal treatment, light treatment, etc.) of the mountain and/or valley creases can alter the mechanical and/or physical properties of the resch origami structure 14. Stated differently, one or more desired properties of the resch origami structure 14 can be designed or obtained by selecting or adjusting the thickness, strength, and elastic modulus of the sheet of material 10, and/or treatment of the mountain and/or valley creases of the resch origami structure 14. For example, in some variations the resch origami structure 14 can move or "spring" from a first shape (e.g., FIG. 2D) to a second shape (e.g., FIG. 2C) with a desired and/or predefined amount of force. And the outer facing surface 18 of the resch origami structure 14 in the second shape can provide a load bearing and/or support surface.

Referring now to FIG. 3, a morphing origami structure 16 according to the teachings of the present disclosure in a first shape (e.g., non-deployed shape) is shown. The morphing origami structure 16 includes the resch origami structure 14 with a plurality of inflatable cells 110 attached to the hexagonal polygons 100. In some variations, and as illustrated in FIG. 3, an inflatable cell 110 is attached to each of the hexagonal polygons 100 (referred to herein individually as inflatable cell 110-0, inflatable cell 110-1, inflatable cell 110-3, . . . inflatable cell 110-6). However, in other variations, at least one of the hexagonal polygons 100 does not have an inflatable cell 110 attached thereto.

Referring to FIGS. 3A-3C, cross-sectional views of section 3A-3C-3A-3C in FIG. 3 are shown according to different forms of the present disclosure. The plurality of hexagonal polygons 100 individually have an outer facing polygonal facet 105 and an inner facing polygonal facet 107, and the plurality of inflatable cells 110 individually include a membrane 112 and an interior volume 114 at least partially defined by the membrane 112.

With reference to FIG. 3A, the plurality of inflatable cells 110 are disposed on and/or attached to the outer facing polygonal facets 105 such that the interior volumes 114 of the plurality of inflatable cells 110 is disposed between the membrane 112 and the outer facing polygonal facets 105. With reference to FIG. 3B, at least one of the plurality of inflatable cells 110 is disposed on and/or attached to an inner facing polygonal facet 107 such that the interior volume(s) 114 of the at least one of the plurality of inflatable cells 110 is disposed between the membrane 112 and the inner facing polygonal facet(s) 107. And with reference to FIG. 3C, all of the plurality of inflatable cells 110 are disposed on and/or attached to an inner facing polygonal facet 107 such that all of the interior volumes 114 of the plurality of inflatable cells 110 is disposed between the membrane 112 and the inner facing polygonal facets 107 of the hexagonal polygons 100.

Figure 4:
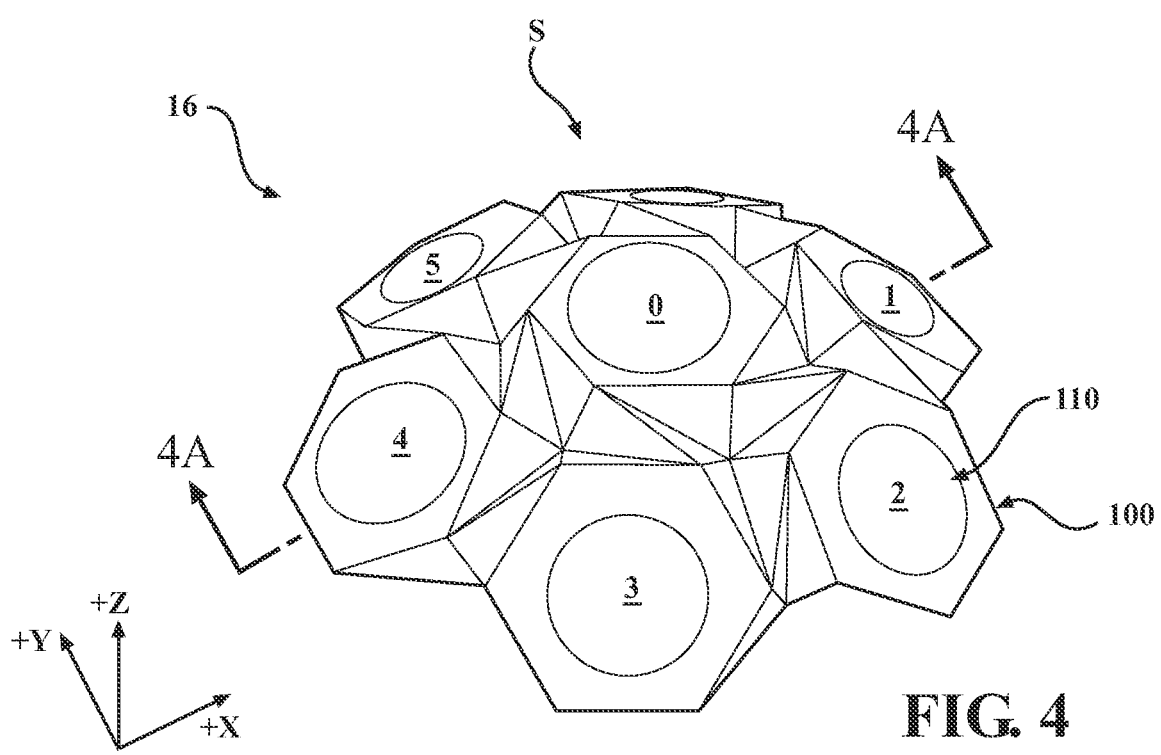
FIG. 4 is a perspective view of FIG. 3 with the resch origami structure in a second shape configuration.
Figure 4A:
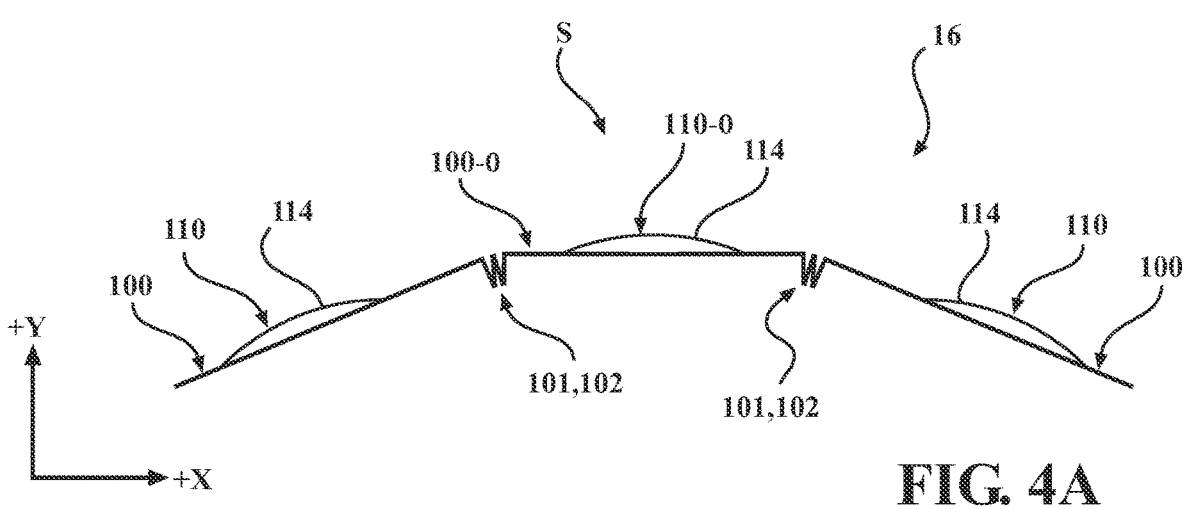
FIG. 4A is a cross-section view of section 4A-4A in FIG. 4.

Referring to FIGS. 4 and 4A, a perspective view of the morphing origami structure 16 in a second shape (e.g., deployed shape) is shown and a cross-sectional view of section 4A-4A in FIG. 4 is shown in FIG. 4A. As shown in FIGS. 4 and 4A, the morphing origami structure 16 has a hemispherical shape 'S' which can be used as a load bearing and/or impact bearing structure as described in greater detail below.

Figure 5:
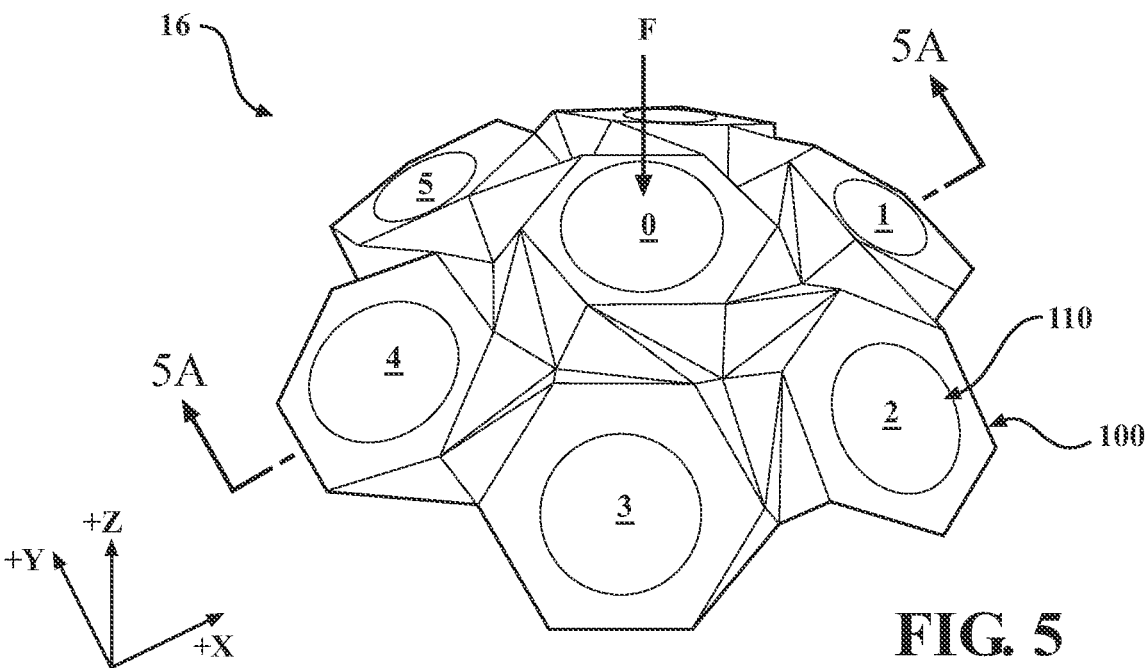
FIG. 5 illustrates the resch origami structure in FIG. 4 with one of the inflatable cells being inflated and applying a force onto one of the outer polygonal facets.
Figure 5A:
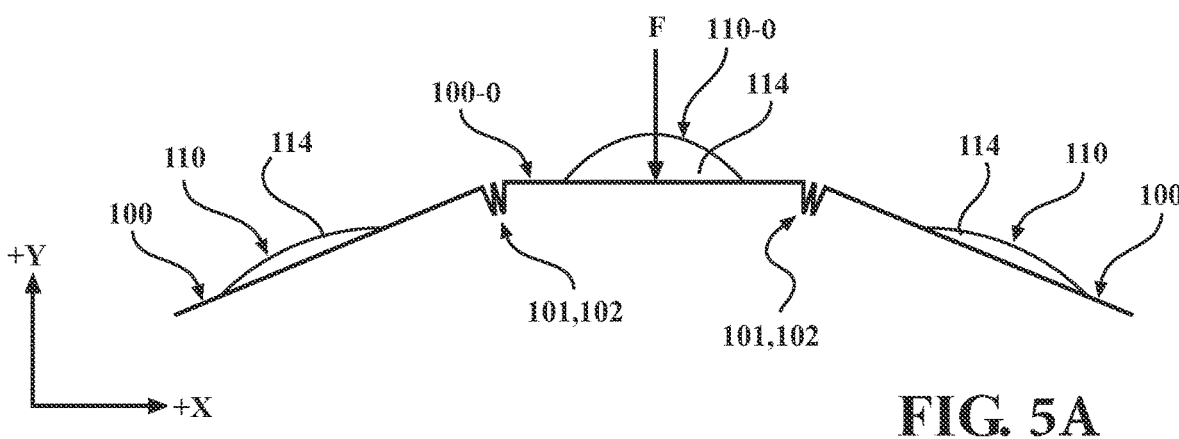
FIG. 5A is a cross-sectional view of section 5A-5A in FIG. 5.
Figure 5B:
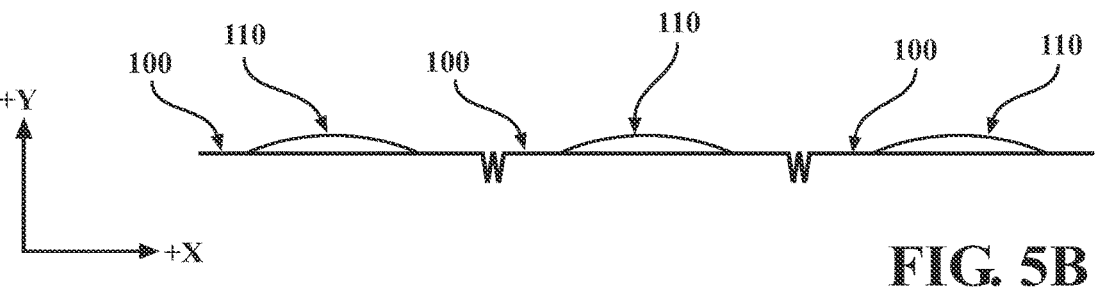
FIG. 5B shows FIG. 5A after changing shape due to the applying the force onto the outer polygonal facet such that the morphing origami structure morphs from the second shape configuration to the first shape configuration.

Referring to FIGS. 5-5B, movement (morphing) of the morphing origami structure 16 from the second shape configuration shown in FIG. 4 to a first shape configuration is illustrated. Particularly, when the morphing origami structure 16 is in the second shape as shown in FIGS. 5 and 5A, the inflatable cells 110-0 is inflated (shown as inflatable cell 110*i*) such that a downward (−z direction) forced 'F' is applied to the hexagonal polygon 100-0 to which it is attached. In addition, the force F moves the hexagonal polygon 100-0 downward (−z direction) until the hexagonal polygon 100-0 is generally positioned or located on the same x-y plane as the other hexagonal polygons 100 of the morphing origami structure 16, i.e., in the first shape. In this manner, the morphing origami structure 16 can be morphed from a first shape as shown in FIG. 3 to a second shape as shown in FIG. 4, and returned to the first shape as illustrated in FIGS. 5A-5B.

Figure 5C:
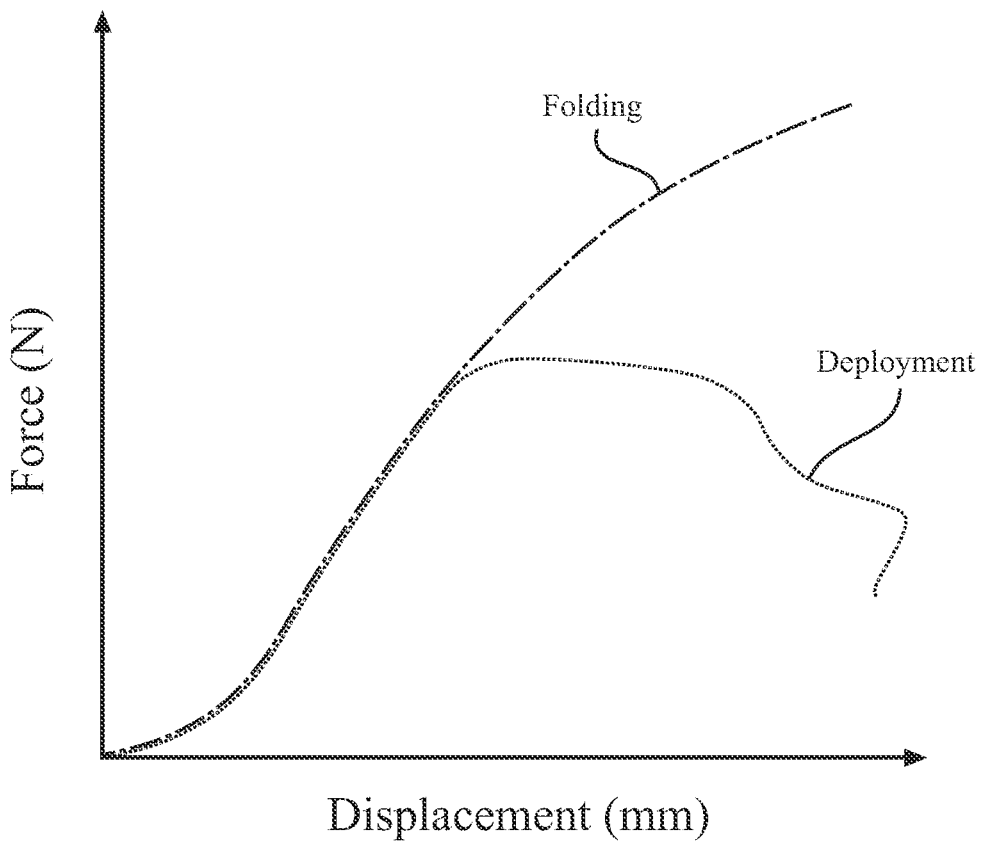
FIG. 5C is a graphical plot of force versus displacement resulting morphing of the morphing origami structure according to the teachings of the present disclosure.

Referring to FIG. 5C, a graphical plot of the force needed for morphing of the morphing origami structure 16 into the first shape and the second shape is shown. Particularly, when the pressure 'p' in the inflatable cell 110-0 (i.e., p0) is different than the pressure in the surrounding inflatable cells 110-1-110-6 (i.e., p1-p6), the morphing origami structure 16 has two different shape configurations. For example, when p0<p1+p2+p3+p4+p5+p6, the morphing origami structure 16 will morph into deployed shape, and when p0>p1+p2+p3+p4+p5+p6, the morphing origami structure 16 will morph into a folded or non-deployed shape. Accordingly, the inflatable cells 110 function as the driving force and/or mechanism for an in-situ shape change of the morphing origami structure 16 and a first pressure configuration for the plurality of inflatable cells 110 provides a deployed shape to the tessellation origami structure and a second pressure configuration for the plurality of inflatable cells 110 provides a non-deployed shape to the tessellation origami structure.

It should be understood that while FIGS. 5-5B illustrate the central inflatable cell 110-0 being inflated/pressurized such that a force F is applied to the central hexagonal polygon 100-0, in some variations other inflatable cells 110 are independently inflated such that the morphing origami structure 16 is moved into different shape configurations.

For example, when p1<p0+p2+p3+p4+p5+p6, the morphing origami structure 16 will morph into a different shape than the shape shown in the figures, or when p2<p0+p1+p3+p4+p5+p6, the morphing origami structure 16 will morph into another different shape than shown in the figures and when p1<p0+p2+p3+p4+p5+p6.

Figure 6A:
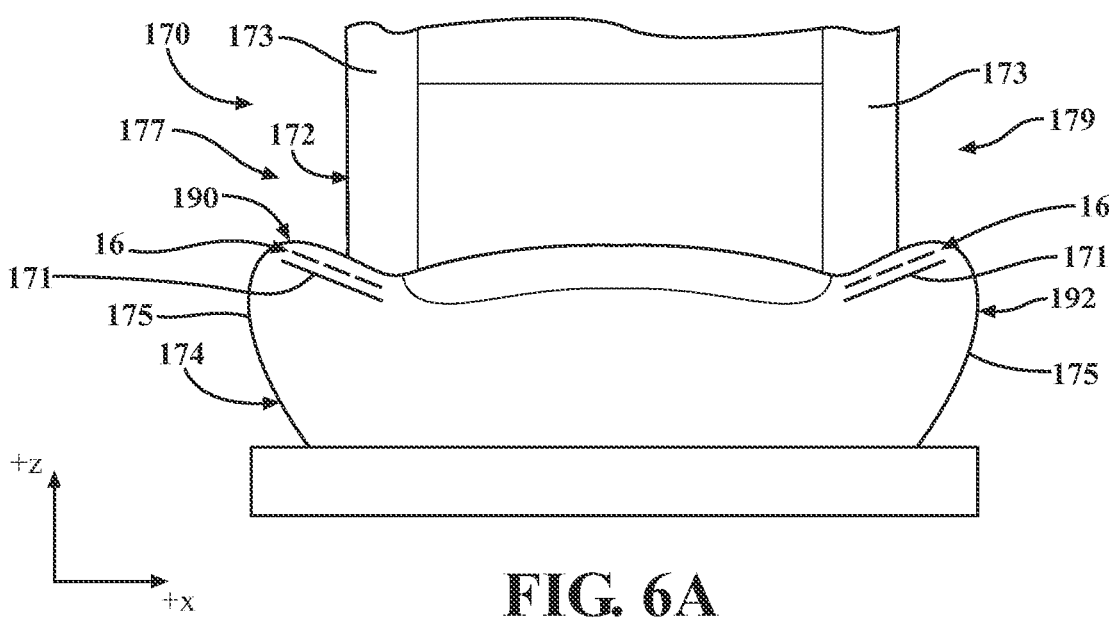
FIG. 6A is a vehicle seat with a pair of morphing origami structures according to the teachings of the present disclosure.
Figure 6B:
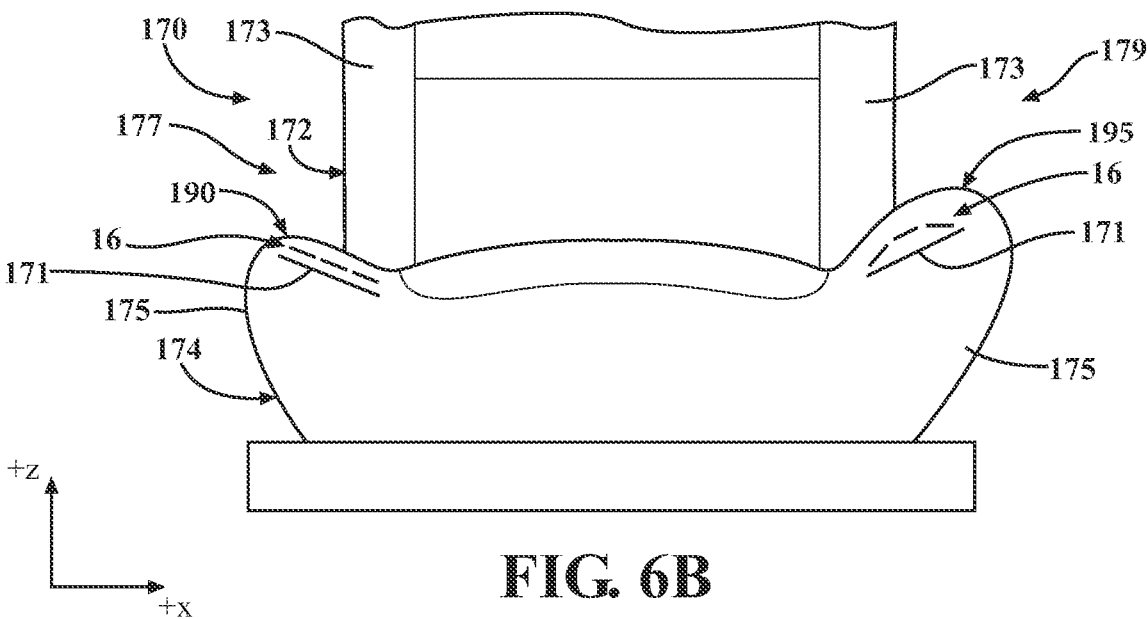
FIG. 6B is the vehicle seat in FIG. 6A with one of the morphing origami structures in a deployed configuration.

Referring now to FIGS. 6A-6B, a non-limiting example of the use and/or operation of the morphing origami structure 16 is illustrated. Particularly, the morphing origami structure 16 is included as part of and/or disposed within a cushion portion 174 of a vehicle seat 170. That is, the morphing origami structure 16 is operatively positioned within the vehicle seat 170 relative to one or more surfaces or portions of the seat(s) 170. The surfaces include a surface of the back portion 172, the cushion portion 174, the bolster 173 of the back portion 172, the bolster 175 of the cushion portion 174, and/or a headrest. When actuated, the morphing origami structure 16 cause the surfaces or portions of the seat to morph into a different configuration (FIG. 6B). In the arrangements shown herein, it should be noted that the morphing origami structure 16 can be a single morphing origami structure, a single stack of morphing origami structures, a plurality of morphing origami structures, a plurality of stacks of morphing origami structures, and/or combinations thereof. In addition, in some variations, an optional support 171 is included and configured to provide structural support for movement of the morphing origami structure 16.

With reference to FIG. 6A, a morphing origami structure 16 in the bolster 175 of a first side 177 of the seat 170 and another morphing origami structure 16 in the bolster of a second side 179 of the seat 170 are in a non-deployed shape configuration. Stated differently, the bolster 175 on the first side 177 has a non-deployed shape configuration 190 and the bolster 175 on the second side 179 has a non-deployed shape configuration 192. In addition, the non-deployed shape configurations 190, 192 may or may not be substantially mirror images of each other.

With reference to FIG. 6B, the morphing origami structure 16 on the first side 177 remains in the non-deployed shape configuration 190, however, the morphing origami structure 16 on the second side 179 is in a deployed shape configuration. As a result, the bolster 175 on the second side 179 is in a deployed configuration 195. And as shown in FIG. 6B, the overall size of the bolster 175 on the second side 179 has become enlarged overall and it should be understood that the bolster 175 in the deployed configuration 195 can provide additional resistance to lateral (x-direction) acceleration of a vehicle occupant in that direction, such as when a vehicle is turning. And while FIGS. 6A-6B illustrated the morphing origami structures 16 disposed in the bolsters of the vehicle seat 170, it should be understood that the morphing origami structures can be disposed in or included with a back portion 172 of the vehicle seat 170 and/or a head cushion (not shown) of the vehicle seat 170.

Figure 7A:
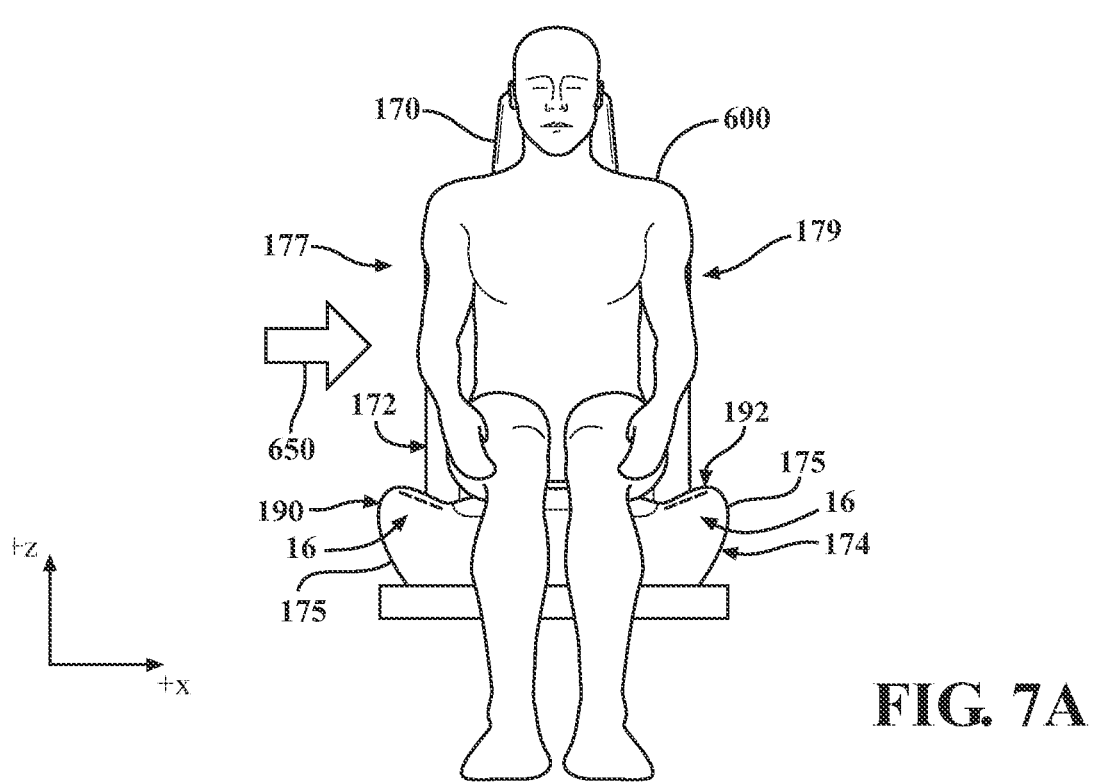
FIG. 7A illustrates an occupant in a vehicle seat with a pair of morphing origami structures according to the teachings of the present disclosure.
Figure 7B:
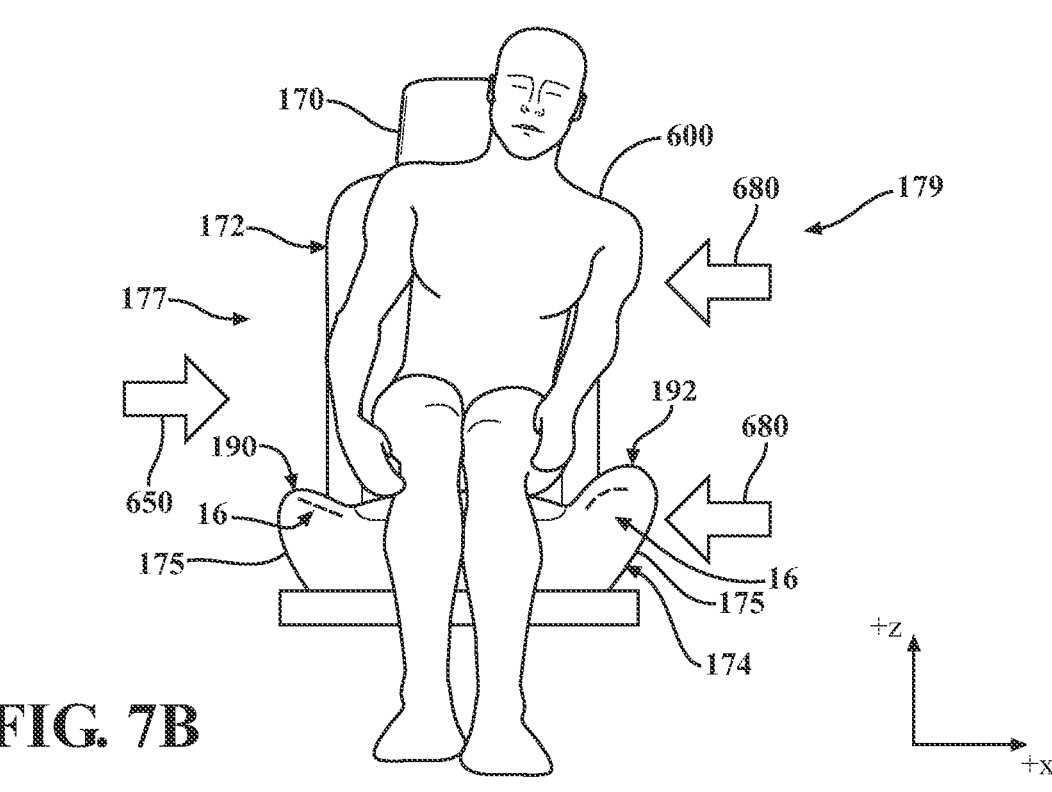
FIG. 7B illustrates the occupant in the vehicle seat in FIG. 7B with one of the morphing origami structures in a deployed configuration.

Referring to FIGS. 7A-7B, another non-limiting example of the operation of the arrangements described herein is illustrated in connection to FIGS. 6A-6B. FIGS. 7A-7B illustrate an occupant 600 in the vehicle seat 170 with the morphing origami structures 16. With reference to FIG. 7A, an example of the occupant 600 in the vehicle seat 170 when the morphing origami structures 16 are in a non-deployed shape configuration is shown. However, when the vehicle makes a turn (e.g., a right turn), particularly at higher speeds, lateral acceleration forces 650 can act on the vehicle and/or occupant 600. As a result, the occupant 600 may actually be or may feel like he or she is being pushed, moved, and/or forced at least to the left (−x direction) due to such forces.

And in response to the lateral acceleration forces 650 acting on the vehicle and/or occupant 600, the morphing origami structure 16 on the second side 179 of the vehicle seat 170 is deployed and morphs from the non-deployed shape configuration illustrated in FIG. 7A to the deployed shape configuration illustrated in FIG. 7B. And as illustrated in FIG. 7B, the bolster 175 of the cushion portion 174 becomes enlarged as a result of the actuation of the morphing origami structure 16 such that support is provided to the occupant 600. Similarly, though not visible in FIG. 7B, the bolster 173 of the back portion 172 can become enlarged as a result of the actuation of a morphing origami structure 16, and as such, the bolsters 173, 175 can provide lateral support 680 to the occupant 600, which can help to reduce the effects experienced by the occupant 600 due to the lateral acceleration forces 650.

Figure 8:
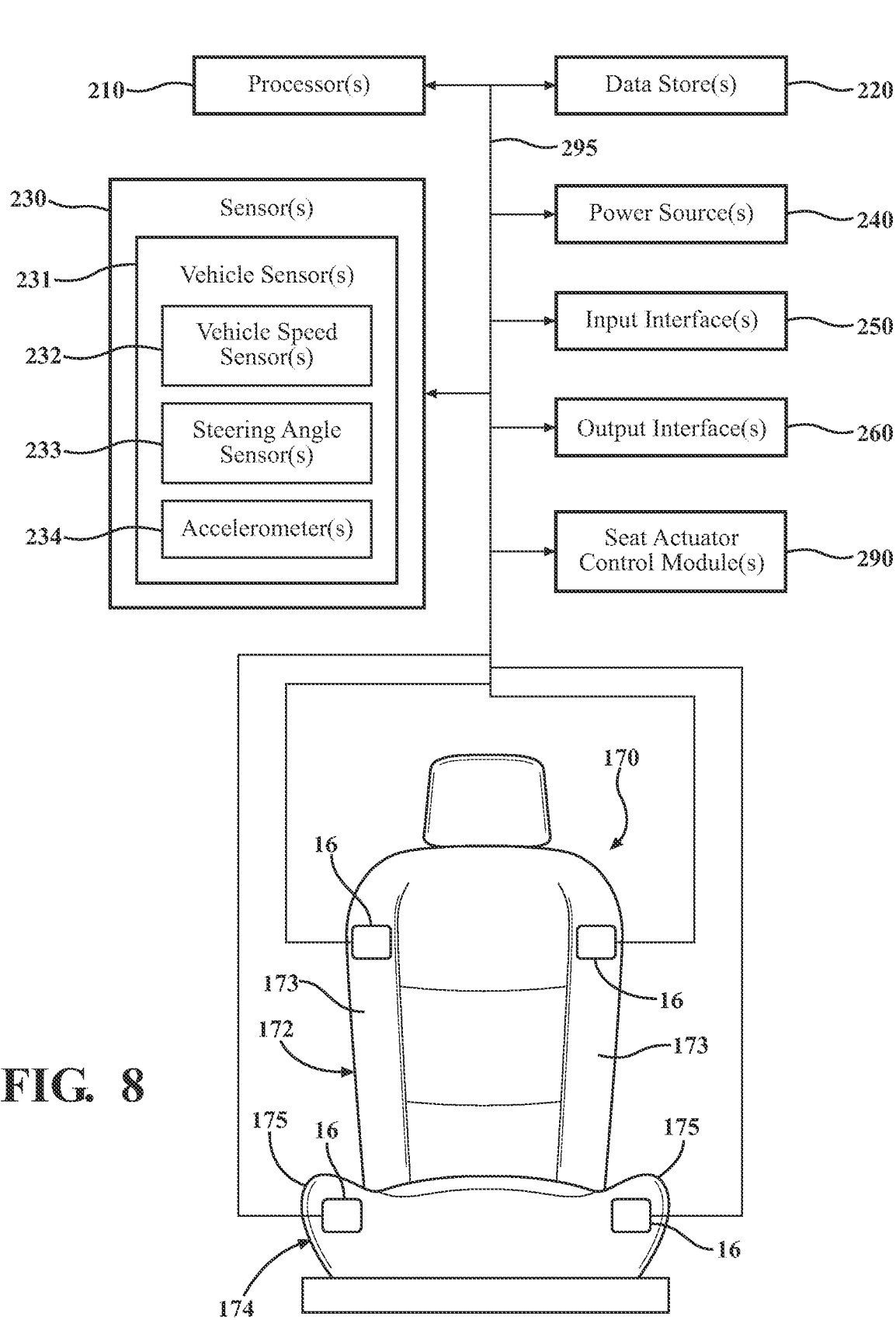
FIG. 8 illustrates a vehicle seat system according to the teachings of the present disclosure.

Referring to FIG. 8, a portion of a vehicle 200 with one or more morphing origami structures is shown. As used herein, "vehicle" means any form of motorized transport. In one or more implementations, the vehicle 200 can be an automobile. While arrangements will be described herein with respect to automobiles, it will be understood that embodiments are not limited to automobiles. In some implementations, the vehicle may be a watercraft, an aircraft, or any other form of motorized transport.

The vehicle 200 can include various elements. Some of the possible elements of the vehicle 200 include one or more processors 210, one or more data stores 220, one or more sensors 230, one or more power sources 240, one or more input interfaces 250, one or more output interfaces 260, one or more seats 170, one or more morphing origami structures 16, and one or more seat actuator control modules 280. Each of these elements will be described in turn below.

As noted above, the vehicle 200 can include one or more processors 210. "Processor" means any component or group of components that are configured to execute any of the processes described herein or any form of instructions to carry out such processes or cause such processes to be performed. The processor(s) 210 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 210 can include at least one hardware circuit (e.g., an integrated circuit) configured to carry out instructions contained in program code. In arrangements in which there is a plurality of processors 210, such processors can work independently from each other or one or more processors can work in combination with each other. In one or more arrangements, one or more processors 210 can be a main processor(s) of the vehicle 200. For instance, one or more processors 210 can be electronic control unit(s) (ECU).

The vehicle 200 can include one or more data stores 220 for storing one or more types of data. The data store(s) 220 can include volatile and/or non-volatile memory. Examples of suitable data stores 220 include RAM (Random Access Memory), Nash memory. ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 220 can be a component of the processor(s) 210, or the data store(s) 220 can be operatively connected to the processor(s) 210 for use thereby. The term "operatively connected," as used throughout this description, can include direct or indirect connections, including connections without direct physical contact.

The vehicle 200 can include one or more sensors 230. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the vehicle 200 includes a plurality of sensors 230, the sensors can work independently from each other. Alternatively, two or more of the sensors can work in combination with each other. In such case, the two or more sensors can form a sensor network. The sensor(s) 230 can be operatively connected to the processor(s) 210, the data store(s) 220, and/or other elements of the vehicle 200.

The sensor(s) 230 can include any suitable type of sensor. Various examples of different types of sensors will be described herein. However, it will be understood that the embodiments are not limited to the particular sensors described.

The sensor(s) 230 can include one or more vehicle sensors 231. The vehicle sensor(s) 231 can detect, determine, assess, monitor, measure, quantify and/or sense information about the vehicle 200 itself (e.g., position, orientation, speed, etc.). In one or more arrangements, the vehicle sensors 231 can include one or more vehicle speed sensors 232, one or more steering angle sensors 233, and/or one or more accelerometers 234. The vehicle speed sensor(s) 232 can be any sensor configured to detect, determine, assess, monitor, measure, quantify and/or sense the speed of a vehicle, now known or later developed. The steering angle sensors 233, can be any sensor configured to detect, determine, assess, monitor, measure, quantify and/or sense the steering wheel position angle and/or rate of turo, now known or later developed. The accelerometers 234 can include any sensor, now known, or later developed, configured to detect, determine, assess, monitor, measure, quantify and/or sense any information or data about acceleration forces experience by a vehicle or occupants of the vehicle. The accelerometers 224 can be configured to detect, determine, assess, monitor, measure, quantify and/or sense any information or data about lateral acceleration forces.

Alternatively or in addition, the sensor(s) 230 can include one or more environment sensors configured to detect, determine, assess, monitor, measure, quantify, acquire, and/or sense driving environment data. "Driving environment data" includes data or information about the external environment in which a vehicle is located or one or more portions thereof. In one or more arrangements, the environment sensors can include one or more cameras, one or more radar sensors, one or more lidar sensors, one or more sonar sensors, and/or one or more ranging sensors.

As noted above, the vehicle 200 can include one or more power sources 240. The power source(s) 240 can be any power source capable of and/or configured to energize the morphing origami structure(s) 16. For example, the power source(s) 240 can include one or more batteries, one or more fuel cells, one or more generators, one or more alternators, one or more solar cells, and combinations thereof. In some arrangements, the power source(s) 240 can be configured to supply positively charged electrical energy and/or negatively charged electrical energy.

The vehicle 200 can include one or more input interfaces 250. An "input interface" includes any device, component, system, element or arrangement of groups thereof that enable information/data to be entered into a machine. The input interface(s) 250 can receive an input from a vehicle occupant (e.g., a driver or a passenger). Any suitable input interface 250 can be used, including, for example, a keypad, display, touch screen, multi-touch screen, button, joystick, mouse, trackball, microphone and/or combinations thereof.

The vehicle 200 can include one or more output interfaces 260. An "output interface" includes any device, component, system, element or arrangement of groups thereof that enable information/data to be presented to a vehicle occupant (e.g., a person, a vehicle occupant, etc.). The output interface(s) 260 can present information/data to a vehicle occupant. The output interface(s) 260 can include a display. Alternatively or in addition, the output interface(s) 260 may include an earphone and/or speaker. Some components of the vehicle 200 may serve as both a component of the input interface(s) 250 and a component of the output interface(s) 260.

The vehicle 200 can include one or more seats 170. The seat(s) 170 can be for any vehicle occupants, such for a driver or for a passenger. The seat(s) 170 can be any type of vehicle seat, now known or later developed. The one or more seats 170 can have any suitable configuration. For instance, the one or more seats 170 can include a back portion 172 and a cushion portion 174. The back portion 172 and/or the cushion portion 174 can include bolsters 173, 175, respectively.

In one or more arrangements, one or more portions of the seat(s) 170 can be configured to counteract lateral acceleration forces experienced by a vehicle occupant. To that end, the vehicle 200 can include one or more morphing origami structures 16. The morphing origami structure(s) 16 can be operatively connected to one or more of the seats 170. In one or more arrangements, the morphing origami structure(s) 16 can be located within a portion of the seat 170. For instance, the morphing origami structure(s) 16 can be located within the back portion 172 of the seat(s) 170 and/or within the cushion portion 174 of the seat(s) 170. More particularly, the morphing origami structure(s) 16 can be located within a bolster of the back portion 172 and/or a bolster of the cushion portion 174.

The morphing origami structure(s) 16 can be operatively positioned relative to one or more surfaces or portions of the seat(s) 170. The surfaces can be a surface of the back portion 172, the cushion portion 174, a bolster of the back portion 172, and/or a bolster of the cushion portion 174. When actuated, the morphing origami structure(s) 16 can cause the surfaces or portions of the seat 170 to morph into a different configuration.

The morphing origami structure(s) 16 can be any element or combination of elements operable to modify, adjust and/or alter one or more surfaces or portions of the vehicle seat(s) 170. The morphing origami structure(s) 16 may activate responsive to receiving signals or other inputs from the processor(s) 210 and/or the seat actuator control module(s) 290. The processor(s) 210 and/or the seat actuator control module(s) 290 can be operatively connected to the morphing origami structure(s) 16. In FIG. 8, the morphing origami structure(s) 16 are generally represented by a rectangular feature.

It should be noted that the morphing origami structure(s) 16 can be operatively positioned so that portions of the vehicle seat 170 can be morphed in a plurality of directions. Thus, one or more morphing origami structures 16 can be configured to morph a first portion of the seat in a first direction, and one or more morphing origami structures 16 can be configured to morph a second portion of the seat 170 in a second direction. In some instances, the first portion and the second portion can be the same. In other instances, the first portion and the second portion can be different.

The vehicle 200 can include one or more modules, at least some of which will be described herein. The modules can be implemented as computer readable program code that, when executed by a processor, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively or in addition, one or more data stores 220 may contain such instructions.

The vehicle 200 can include one or more modules. In one or more arrangements, the modules described herein can include artificial or computational intelligence elements, e.g., neural network, fuzzy logic, or other machine learning algorithms. Further, in one or more arrangements, the modules can be distributed among a plurality of modules. In one or more arrangements, two or more of the modules described herein can be combined into a single module.

The vehicle 200 can include one or more seat actuator control modules 290. The seat actuator control module(s) 290 can include profiles and logic for actively controlling the morphing origami structure(s) 16 according to arrangements herein. The seat actuator control module(s) 290 can be configured to determine when the morphing origami structure(s) 16 should be deployed or not deployed. The seat actuator control module(s) 290 can be configured to do so in any suitable manner. For instance, the seat actuator control module(s) 290 can be configured to analyze data or information acquired by the sensor(s) 230 (e.g., the vehicle speed sensor(s) 232, the steering angle sensor(s) 233, and/or the accelerometers 234). Alternatively or additionally, the seat actuator control module(s) 290 can be configured to detect user inputs (e.g., commands) provided on the input interface(s) 250. The seat actuator control module(s) 290 can retrieve raw data from the sensor(s) 230 and/or from the data store(s) 220. The seat actuator control module(s) 290 can use profiles, parameters, or setting loaded into the seat actuator control module(s) 290 and/or stored in the data store(s) 220.

The seat actuator control module(s) 290 can analyze the sensor data to determine an appropriate action for the seat(s) 170. The seat actuator control module(s) 290 can be configured to cause one or more morphing origami structures 16 to be deployed or not deployed. As used herein, "cause" or "causing" means to make, force, compel, direct, command, instruct, and/or enable an event or action to occur or at least be in a state where such event or action may occur, either in a direct or indirect manner. For instance, the seat actuator control module(s) 290 can selectively permit or prevent the flow of electrical energy from the power source(s) 240 to the morphing origami structure(s) 16. The seat actuator control module(s) 290 can be configured to send control signals or commands over a communication network 295 to the morphing origami structure(s) 16.

The seat actuator control module(s) 290 can be configured to cause the morphing origami structure(s) 16 to be selectively deployed or not deployed based on one or more activation parameters. For instance, the seat actuator control module(s) 290 can be configured to compare one or more detected activation characteristics to one or more activation thresholds. If the threshold is met, then the seat actuator control module(s) 290 can cause the morphing origami structure(s) 16 to be deployed or maintained in a deployed condition. If the threshold is not met, then the seat actuator control module(s) 290 can cause the morphing origami structure(s) 16 to be non-deployed or maintained in a non-deployed state.

For instance, there can be a vehicle speed threshold. In one or more arrangements, the vehicle speed threshold can be about 30 miles per hour (mph), 35 mph, 40 mph, 45 mph, 50 mph, 55 mph, 60 mph, 65 mph, 70 mph, or even greater, just to name a few possibilities. If a detected vehicle speed is above the vehicle speed threshold, the seat actuator control module(s) 290 can be configured to cause the morphing origami structure(s) 16 to be deployed or maintained in a deployed state. If a detected vehicle speed is below the vehicle speed threshold, the seat actuator control module(s) 290 can be configured to cause the morphing origami structure(s) 16 to be non-deployed or maintained in a non-deployed state.

As another example, there can be a steering angle threshold. In one or more arrangements, the steering angle threshold can be about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, or about 90 degrees, just to name a few possibilities. If a detected steering angle is above the steering angle threshold, the seat actuator control module(s) 290 can be configured to cause the morphing origami structure(s) 16 to be deployed or maintained in a deployed state. If a detected steering angle is below the vehicle speed threshold, the seat actuator control module(s) 290 can be configured to cause the morphing origami structure(s) 16 to be non-deployed or maintained in a non-deployed state.

In one or more arrangements, the seat actuator control module(s) 290 can be configured to cause the morphing origami structure(s) 16 to be selectively deployed or not deployed based on both a vehicle speed threshold and a steering angle threshold. Thus, if a detected vehicle speed is above the vehicle speed threshold and if a detected steering angle is above the steering angle threshold, the seat actuator control module(s) 290 can be configured to cause the morphing origami structure(s) 16 to be deployed or maintained in a deployed state. If a detected vehicle speed is below the vehicle speed threshold and/or if a detected steering angle is below the steering angle threshold, the seat actuator control module(s) 290 can be configured to cause the morphing origami structure(s) 16 to be non-deployed or maintained in a non-deployed state.

As another example, there can be an acceleration threshold, such as a lateral acceleration threshold. Thus, if a detected or determined lateral acceleration of the vehicle is above the lateral acceleration threshold, the seat actuator control module(s) 290 can be configured to cause the morphing origami structure(s) 16 to be deployed or maintained in a deployed state. If a detected steering angle is below the lateral acceleration threshold, the seat actuator control module(s) 290 can be configured to cause the morphing origami structure(s) 16 to be non-deployed or maintained in a non-deployed state.

In some instances, the seat actuator control module(s) 290 can be configured to cause the morphing origami structure(s) 16 to be selectively deployed or non-deployed based on user inputs (e.g., commands). For instance, a user can provide an input on the input interface(s) 250. The input can be to activate or deactivate the morphing origami structure(s) 16. The seat actuator control module(s) 290 can be configured to cause the morphing origami structure(s) 16 to be non-deployed or deployed in accordance with the user input.

The seat actuator control module(s) 290 can be configured to control a plurality of seats 170. The seat actuator control module(s) 290 can be configured to control each seat 170 individually. Thus the control of one seat 170 is independent of the control of the other seats 170. Alternatively, the seat actuator control module(s) 290 can be configured to control the plurality of seat(s) 170 collectively. Thus, each seat 170 can be deployed or non-deployed at substantially the same time, to the same degree of actuations, and/or in substantially the same manner.

It should be noted that the seat actuator control module(s) 290 can be configured to determine the direction in which lateral acceleration will occur. Thus, if the seat actuator control module(s) 290 determines that the direction of lateral acceleration will be to the right, the seat actuator control module(s) 290 can activate the morphing origami structure(s) 16 on the opposite side (i.e., left side) of the seat 170. Similarly, if the seat actuator control module(s) 290 determines that the direction of lateral acceleration will be to the left, the seat actuator control module(s) 290 can activate the morphing origami structure(s) 16 on the opposite (i.e., right) side of the seat 170.

The various elements of the vehicle 200 can be communicatively linked to one another or one or more other elements through one or more communication networks 295. As used herein, the term "communicatively linked" can include direct or indirect connections through a communication channel, bus, pathway or another component or system. A "communication network" means one or more components designed to transmit and/or receive information from one source to another. The data store(s) 220 and/or one or more other elements of the vehicle 200 can include and/or execute suitable communication software, which enables the various elements to communicate with each other through the communication network and perform the functions disclosed herein.

The one or more communication networks 295 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20. Wi-Fi Protected Access (WPA), or WPA2) or long range (e.g., a mobile, cellular, and/or satellite-based wireless network; GSM, TDMA, CDMA. WCDMA networks or the like). The communication network can include wired communication links and/or wireless communication links. The communication network can include any combination of the above networks and/or other types of networks.

Figure 9:
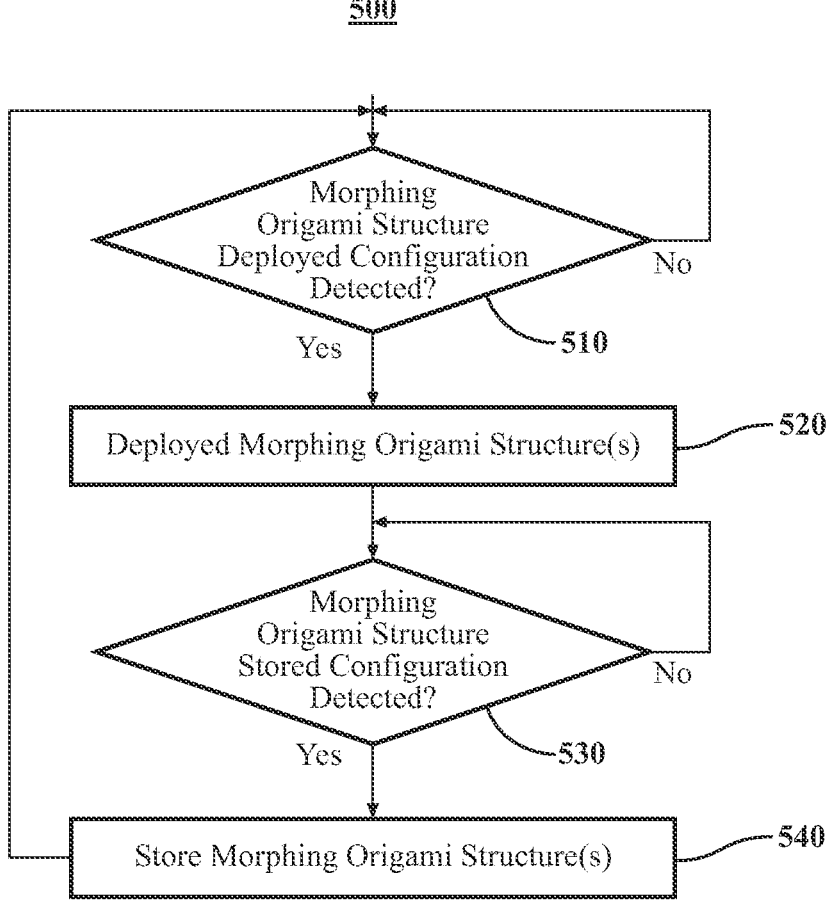
FIG. 9 is a flow chart for a method of selectively morphing a portion of a vehicle seat according to the teachings of the present disclosure.

Referring to FIG. 9, an example of a method 500 is shown. For the sake of discussion, the method 500 can begin with the morphing origami structure(s) 16 in a non-deployed mode, such as is shown in FIG. 6A. In the non-deployed mode, electrical energy from the power source(s) 240 is not supplied to the morphing origami structure(s) 16. At block 510, it can be determined whether a seat activation condition has been detected. The seat activation condition may be detected by the seat actuator control module(s) 290, the processor(s) 210, and/or one or more sensor(s) 230. For instance, the seat actuator control module(s) 290, the processor(s) 210, and/or one or more sensor(s) 230 can determine that data acquired by the vehicle sensor(s) 231 meets a seat activation condition. For instance, the seat actuator control module(s) 290, the processor(s) 210, and/or one or more sensor(s) 230 can determine whether the current vehicle speed and/or the current steering angle meet respective seat activation threshold. Alternatively or additionally, the seat actuator control module(s) 290, the processor(s) 210, and/or one or more sensor(s) 230 can determine whether the current lateral acceleration meets respective seat activation threshold. Alternatively or in addition, the seat actuator control module(s) 290, the processor(s) 210, and/or one or more sensor(s) 230 can detect a user input indicating that the interface should be deployed. The user input can be provided via the input interface(s) 250.

If a seat activation condition is not detected, the method 500 can end, return to block 510, or proceed to some other block. However, if a seat activation condition is detected, then the method can proceed to block 520. At block 520, the morphing origami structure(s) 16 can be deployed. Of course, the seat actuator control module(s) 290 and/or the processor(s) 210 may only actuate certain individual morphing origami structures 16 while leaving others in a non-deployed state. Thus, the seat actuator control module(s) 290 and/or the processor(s) 210 can cause or allow the flow of electrical energy from the power sources(s) 240 to the morphing origami structure(s) 16.

When deployed, the morphing origami structure(s) 16 can morph to a deployed shape, such as is shown in FIG. 4, 6B or 7B. The morphing origami structure(s) 16 can interact with portions of the vehicle seat 170 to cause a portion of the vehicle seat 170 to morph into a deployed configuration, such as is shown in FIG. 4B. The method can continue to block 530.

At block 530, it can be determined whether a seat deactivation condition has been detected. The seat deactivation condition may be detected by the seat actuator control module(s) 290, such as based on data acquired by the sensor(s) 230 and/or by detecting a user input or the cessation of a user input. If a seat deactivation condition is not detected, the method 500 can return to block 530, or proceed to some other block. However, if a deactivation condition is detected, then the method can proceed to block 540. At block 540, the morphing origami structure(s) 16 can be non-deployed. Thus, the seat actuator control module(s) 290 and/or the processor(s) 210 can cause the flow of electrical energy from the power sources(s) 140 to the morphing origami structure(s) 16 to be discontinued.

The method 500 can end. Alternatively, the method 500 can return to block 510 or some other block.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++, Python, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should be also understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A morphing structure comprising:
a tessellation origami structure comprising a plurality of polygons with a plurality of outer polygonal facets; and
a plurality of inflatable cells attached to the plurality of polygons, the plurality of inflatable cells being selectively inflatable such that the morphing structure is an in-situ shape changing morphing structure.

2. The morphing structure according to claim 1, wherein a first pressure configuration for the plurality of inflatable cells provides a deployed shape to the tessellation origami structure and a second pressure configuration for the plurality of inflatable cells provides a non-deployed shape to the tessellation origami structure.

3. The morphing structure according to claim 2, wherein the plurality of polygons comprises a central polygon and a plurality of outer polygons disposed around the central polygon.

4. The morphing structure according to claim 3, wherein the first pressure configuration comprises a pressure in an inflatable cell attached to the central polygon being greater than any pressure in inflatable cells attached to the outer polygons.

5. The morphing structure according to claim 4, wherein the first pressure configuration comprises a pressure in an inflatable cell attached to the central polygon being greater than a sum of the pressures in the inflatable cells attached to the outer polygons.

6. The morphing structure according to claim 5, wherein the first pressure configuration is a folding pressure configuration.

7. The morphing structure according to claim 3, wherein the second pressure configuration comprises a pressure in an inflatable cell attached to the central polygon being less than any pressure in the inflatable cells attached to the plurality of outer polygons.

8. The morphing structure according to claim 7, wherein the second pressure configuration comprises a pressure in an inflatable cell attached to the central polygon being less than a sum of the pressures in the inflatable cells attached to the plurality of outer polygons.

9. The morphing structure according to claim 8, wherein the second pressure configuration is a deployed pressure configuration.

10. The morphing structure according to claim 1 further comprising a compressed gas supply in communication with the plurality of inflatable cells and a controller in communication with the compressed gas supply.

11. The morphing structure according to claim 1, wherein the plurality of outer polygon facets are hexagon polygon facets.

12. The morphing structure according to claim 1, wherein the plurality of polygons comprises more than one type of polygon.

13. The morphing structure according to claim 12, wherein the plurality of polygons comprises a hexagon and a triangle.

14. The morphing structure according to claim 12, wherein the more than one type of polygon comprises a hexagon and at least one of a right triangle or an oblique triangle.

15. The morphing structure according to claim 12, wherein the plurality of polygons comprises a plurality of hexagons, a plurality of right triangles, and a plurality of oblique triangles.

16. A morphing structure comprising:

a tessellation origami structure comprising a plurality of polygons with a plurality of outer polygon facets;

a plurality of inflatable cells attached to the plurality of outer polygon facets, the plurality of inflatable cells being selectively inflatable such that the morphing structure is an in-situ shape changing morphing structure;

a compressed gas supply in communication with the plurality of inflatable cells; and a controller in communication with the compressed gas supply, wherein the controller is configured to command a first pressure configuration for the plurality of inflatable cells and a second pressure configuration for the plurality of inflatable cells.

17. The morphing structure according to claim 16, wherein the second pressure configuration for the plurality of inflatable cells is different than the first pressure configuration for the plurality of inflatable cells.

18. The morphing structure according to claim 17, wherein the first pressure configuration for the plurality of inflatable cells is a deployed shape for the tessellation origami structure and the second pressure configuration for the plurality of inflatable cells is a non-deployed shape for the tessellation origami structure.

19. A morphing structure comprising:

a tessellation origami structure comprising a plurality of polygons with a plurality of outer polygon facets, the plurality of polygons comprising more than one type of polygon;

a plurality of inflatable cells attached to the plurality of outer polygon facets, the plurality of inflatable cells being selectively inflatable such that the morphing structure is an in-situ shape changing morphing structure;

a compressed gas supply in communication with the plurality of inflatable cells; and a controller in communication with the compressed gas supply, the controller configured to command a first pressure configuration for the plurality of inflatable cells and a second pressure configuration for the plurality of inflatable cells different than the first pressure configuration.

20. The morphing structure according to claim 19, wherein the plurality of polygons comprises a plurality of hexagons, a plurality of right triangles, and a plurality of oblique triangles.

* * * * *